(12) United States Patent
Max

(10) Patent No.: US 11,146,684 B2
(45) Date of Patent: Oct. 12, 2021

(54) RETURN CALL ROUTING SYSTEM

(71) Applicant: Israel Max, Woodmere, NY (US)

(72) Inventor: Israel Max, Woodmere, NY (US)

( * ) Notice: Subject to any disclaimer, the term of this patent is extended or adjusted under 35 U.S.C. 154(b) by 0 days.

(21) Appl. No.: 16/825,330

(22) Filed: Mar. 20, 2020

(65) Prior Publication Data
US 2020/0304642 A1    Sep. 24, 2020

Related U.S. Application Data

(60) Provisional application No. 62/821,308, filed on Mar. 20, 2019.

(51) Int. Cl.
*H04M 3/00* (2006.01)
*H04M 5/00* (2006.01)
*H04M 3/523* (2006.01)
*H04M 3/42* (2006.01)

(52) U.S. Cl.
CPC ...... *H04M 3/5232* (2013.01); *H04M 3/42059* (2013.01); *H04M 3/42102* (2013.01)

(58) Field of Classification Search
CPC ........................ H04M 3/5232; H04M 3/42059
USPC ....... 379/265.01–265.14, 266.01–266.1, 309
See application file for complete search history.

(56) References Cited

U.S. PATENT DOCUMENTS

| | | | |
|---|---|---|---|
| 5,519,773 A * | 5/1996 | Dumas | H04M 3/36 379/210.01 |
| 5,943,397 A | 8/1999 | Gabin | |
| 6,493,443 B1 | 12/2002 | Furman | |
| 6,542,591 B1 | 4/2003 | Amro | |
| 6,879,683 B1 | 4/2005 | Fain | |
| 7,454,000 B1 | 11/2008 | Henderson | |
| 8,577,018 B1 * | 11/2013 | Ben-Yair | H04M 3/5232 379/266.01 |
| 8,750,477 B2 * | 6/2014 | Metz | H04M 3/46 379/142.06 |
| 8,855,292 B1 | 10/2014 | Brunson | |
| 9,191,512 B1 * | 11/2015 | Lillard | H04M 3/42382 |
| 9,628,298 B2 | 4/2017 | Deshpsnde | |
| 9,986,096 B2 | 5/2018 | Mezhibovsky | |
| 10,075,584 B2 | 9/2018 | Chandra | |
| 2005/0069121 A1 | 3/2005 | Faruque | |
| 2005/0141694 A1 * | 6/2005 | Wengrovitz | H04M 3/5191 379/265.09 |
| 2006/0015390 A1 * | 1/2006 | Rijsinghani | G06F 16/958 705/7.29 |

(Continued)

OTHER PUBLICATIONS

Cisco, Outbound Option Guide for Cisco Unified Contact Center, Nov. 23, 2017, https://bit.ly/2JTgLLP.

*Primary Examiner* — William J Deane, Jr.
(74) *Attorney, Agent, or Firm* — Seth Natter; Haug Partners LLP

(57) ABSTRACT

A return call routing system verifies that the telephone number of an outbound call being placed by an agent is the telephone number of a contact assigned to the agent. The outbound call is then assigned a tag identifying the contact's phone number as associated with the agent's station. When the routing system recognizes a contact's return call phone number as being tagged, the system bypasses the normal call flow at the call center and the return call is routed directly to the assigned agent's station. A time window for the return call may be set beyond which the return call is directed to the next available agent through a call flow manager.

20 Claims, 4 Drawing Sheets

(56) References Cited

U.S. PATENT DOCUMENTS

| | | | | |
|---|---|---|---|---|
| 2006/0104433 | A1* | 5/2006 | Simpson | H04M 3/5158 |
| | | | | 379/266.07 |
| 2007/0121894 | A1* | 5/2007 | Noble, Jr. | H04M 3/5158 |
| | | | | 379/265.02 |
| 2007/0166238 | A1* | 7/2007 | Duggan | A61P 11/00 |
| | | | | 424/46 |
| 2007/0198368 | A1* | 8/2007 | Kannan | G06Q 10/06311 |
| | | | | 705/26.41 |
| 2007/0294354 | A1* | 12/2007 | Sylvain | H04M 7/003 |
| | | | | 709/206 |
| 2008/0270538 | A1* | 10/2008 | Garg | G06Q 30/04 |
| | | | | 709/204 |
| 2014/0254782 | A1 | 9/2014 | Easley | |
| 2016/0127555 | A1 | 5/2016 | Hanson | |
| 2019/0146647 | A1* | 5/2019 | Ramchandran | G06Q 30/016 |
| | | | | 715/758 |

* cited by examiner

RETURN CALL ROUTING SYSTEM

RELATED APPLICATIONS

This application claims the benefit of Provisional Application No. 62/821,308 filed Mar. 20, 2019, the entirety of which is incorporated herein by reference.

BACKGROUND OF INVENTION

1. Field of Invention

The present invention relates generally to telecommunications and, more particularly, to a system and method for expediting a call back directly to an agent who placed an initial call to a contact.

2. Antecedents of the Invention

A conventional call center is a central place where customer and other telephone calls are handled by an organization, usually with computer automation. Typically, a call center has the ability to handle a volume of calls at the same time, to screen calls and forward incoming calls to an agent. Call centers are employed by organizations that use the telephone to sell or service products or services, such as, mail order businesses, telemarketing companies, product help desks, etc.

Conventional call centers typically include an automatic call distributor (ACD) for routing incoming calls to available and suitable agents for the purpose of addressing the caller's needs. Often the organization disseminates a single telephone number associated with the call center for all outbound calls. When incoming calls are transmitted to the call center by the telephone network, the ACD ordinarily routes the calls to agents based upon some algorithm, typically based on availability. When no suitable agents are available, the calls are routed to queues where the caller waits for the next suitable and available agent.

Call center agents are often assigned a list of potential contacts and receive remuneration premised upon transactions associated with the assigned potential contacts. Often, the agent's call is not answered, e.g. the contact is not at the telephone or the contact's line is in use. Voice mail messages left by the agent are often skipped, however the agent's caller information, e.g., call center phone number and/or company name will reside in the contact's telephone caller ID and/or memory. There exists an incentive for agents who initiated a call to receive the return call from the contact, rather than to have the call routed by an ACD to the next available agent in a queue.

SUMMARY OF THE INVENTION

When a call center agent places a call to an assigned prospective contact, outbound call center identification, i.e., the call center phone number and/or company name, which may be the same identification employed by several agents, appears on the contact's telephone caller ID and memory. The outbound call is assigned a tag identifying the contact's phone number as associated with the agent's phone extension or agent station. The routing system recognizes the contact's return call phone number as being tagged and bypasses the normal call flow at the call center; the return call is routed directly to the assigned agent's station. A time window for the return call may be set beyond which the return call is directed to the next available agent through an ACD, switchboard, etc.

The system of the present invention is equally applicable to small businesses and organizations having extension telephones and the term "call center" should be interpreted to include telephone systems with extension telephone units. It should be understood that as employed herein the term "agent" includes any person who uses a telephone system to make telephone calls as a participant in an organized activity wherein more than one person is making telephone calls; the term "agent station" includes any telephone extension which may comprise a desk telephone, a computer soft phone or a mobile phone.

From the foregoing compendium, it will be appreciated that an aspect of the present invention is to provide a return call routing system of the general character described which is not subject to the aforementioned disadvantages of the antecedents of the invention.

A feature of the present invention is to provide a return call routing system of the general character described which simplifies routing of a return call.

A consideration of the present invention is to provide a return call routing system of the general character described which assures that the return call will be directed to an agent who initiated an unanswered call.

A further aspect of the present invention is to provide a return call routing system of the general character described wherein an incoming telephone number of a return call to a call center number registered in a telephone memory is tagged to identify the calling agent for routing the return call directly to the calling agent.

Another feature of the present invention is to provide a return call routing system of the general character described which assures that an agent at a call center will receive appropriate incentives when a return call is placed to the call center in response to an unanswered call placed by the agent.

To provide a return call routing system of the general character described with increased call center productivity is a further consideration of the present invention.

Yet another aspect of the present invention is to provide a return call routing system of the general character described which routes return calls directly to a calling agent if the return call is placed within a time window of the agent's initial call.

Other aspects, features and considerations of the present invention in part will be obvious and in part will be pointed out hereinafter.

With these ends in view, the invention finds embodiment in various combinations of elements, arrangements of parts and series of steps by which the above-mentioned aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DESCRIPTION OF THE INVENTION

Figure 1:
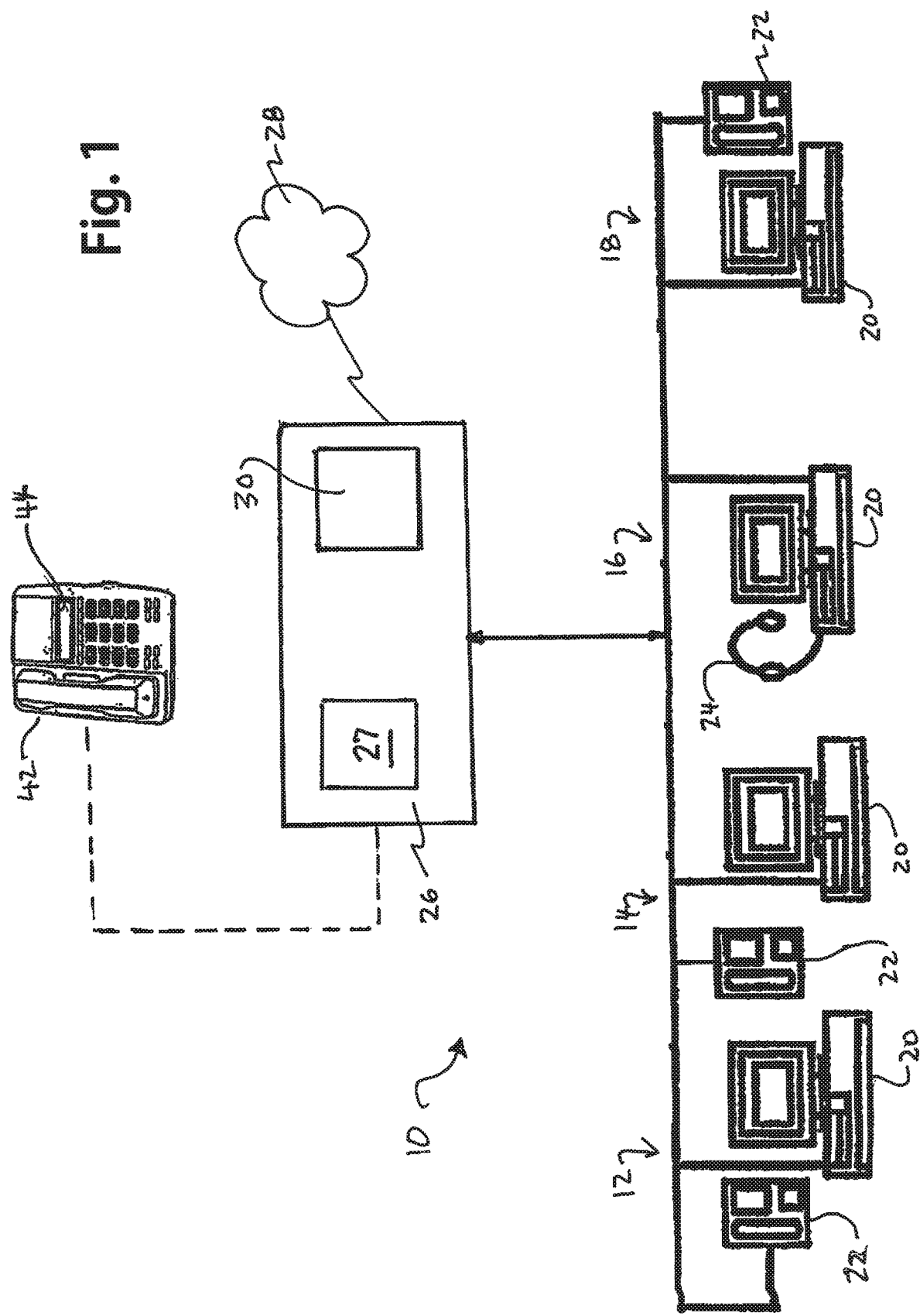
FIG. 1 is a schematized representation of a typical call center configuration wherein a call and a return call is may be processed in accordance with the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein.

Applicant does not intend for any term in the specification or claims to be ascribed an uncommon or special meaning unless explicitly set forth as such. Further, the present invention encompasses present and future known equivalents to the known components referred to herein by way of illustration.

Referring now in detail to the drawings, the reference numeral 10 denotes generally a call center in accordance with the invention. Many call centers use specialized technology rather than old-fashioned software for handling calling needs and customer information. The call center 10 employs a plurality of agents, each operating from an agent station 12, 14, 16, 18. Each agent station may be equipped with agent communication devices, such as, personal desktops 20 for management of operations, data storage and customer references. Agent communication devices may also include telephone receivers 22 and headsets 24 incorporating a listening device and a microphone.

The call center 10 includes a system processor 26 for overall operation and data handling and may interconnect with the cloud 28 for data processing and storage. An incoming call flow manager 30, e.g., auto attendant, ACD, calling group, direct station calling, call forwarding, find me/follow me, etc., is also provided.

Suitable call center software, such as, FreeSWITCH, FreePBX, Asterisk, Avaya Aurora and any other IP based telephony solutions may be employed with routines in accordance with the present invention.

Pursuant to the invention, an agent at each of the agent stations, 12, 14, 16, 18, etc., is assigned a list of prospective contact names and corresponding telephone numbers which will reside in each agent's desktop 20. The telephone number of each assigned contact is encoded with a tag in the system processor memory and a tag is assigned to each agent station.

Figure 2:
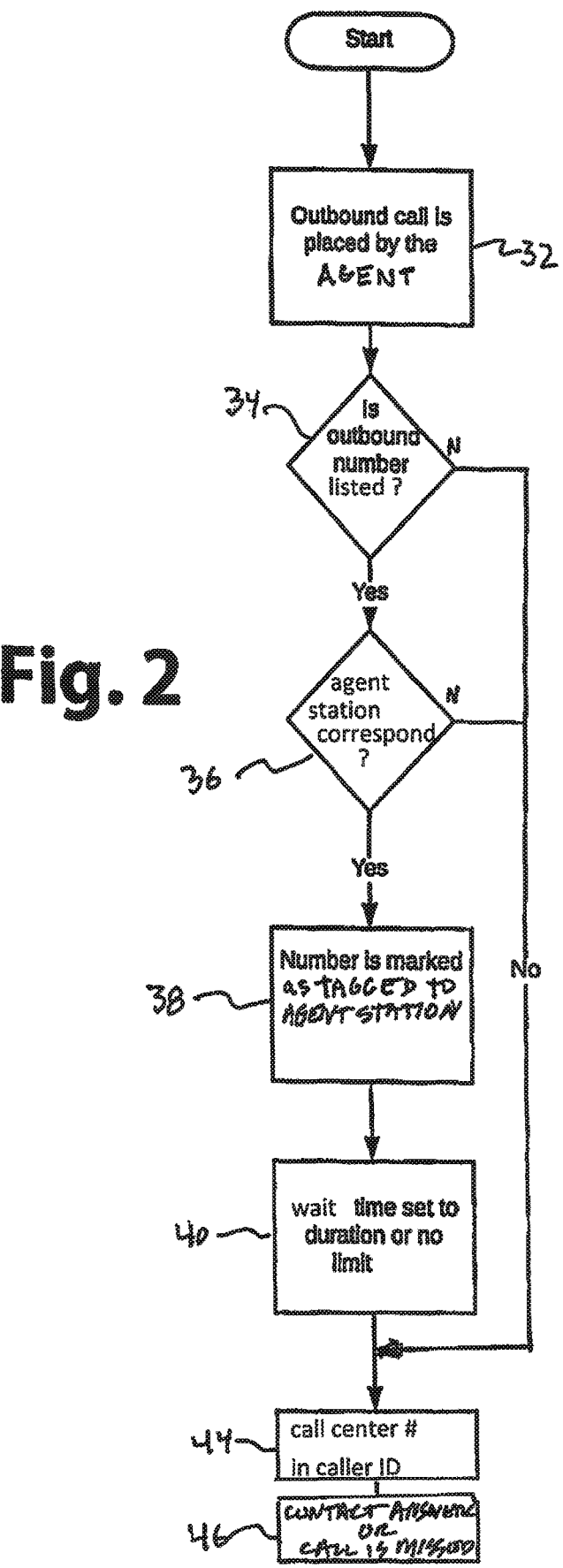
FIG. 2 is a flow diagram depicting a routine for implementing an outbound call from an agent to an assigned contact.

With reference now to FIG. 2, an outbound call placed through the agent station 12, for example, is illustrated in a block 32. An inquiry is made as to whether the outbound number is tagged, as illustrated in a block 34. In the event the outbound telephone number is not tagged, the call is forwarded directly to the contact's telephone.

In the event the outbound telephone number is tagged, the routine proceeds to an inquiry block 36 to determine whether the agent station is correspondingly tagged. In the event the agent station is tagged, the outbound number is marked to indicate that the agent station is placing the call, as indicated in a block 38.

The routine may then proceed to set a wait time duration for the contact to place a return call, as shown in a block 40. The call is then directed to the prospective contact's telephone unit 42, which is illustrated in FIG. 1, with the contact center telephone number appearing in a caller ID 44 and in the memory of the telephone unit 42. The prospective contact either answers the telephone or misses the call, as depicted in a block 46.

Figure 3:
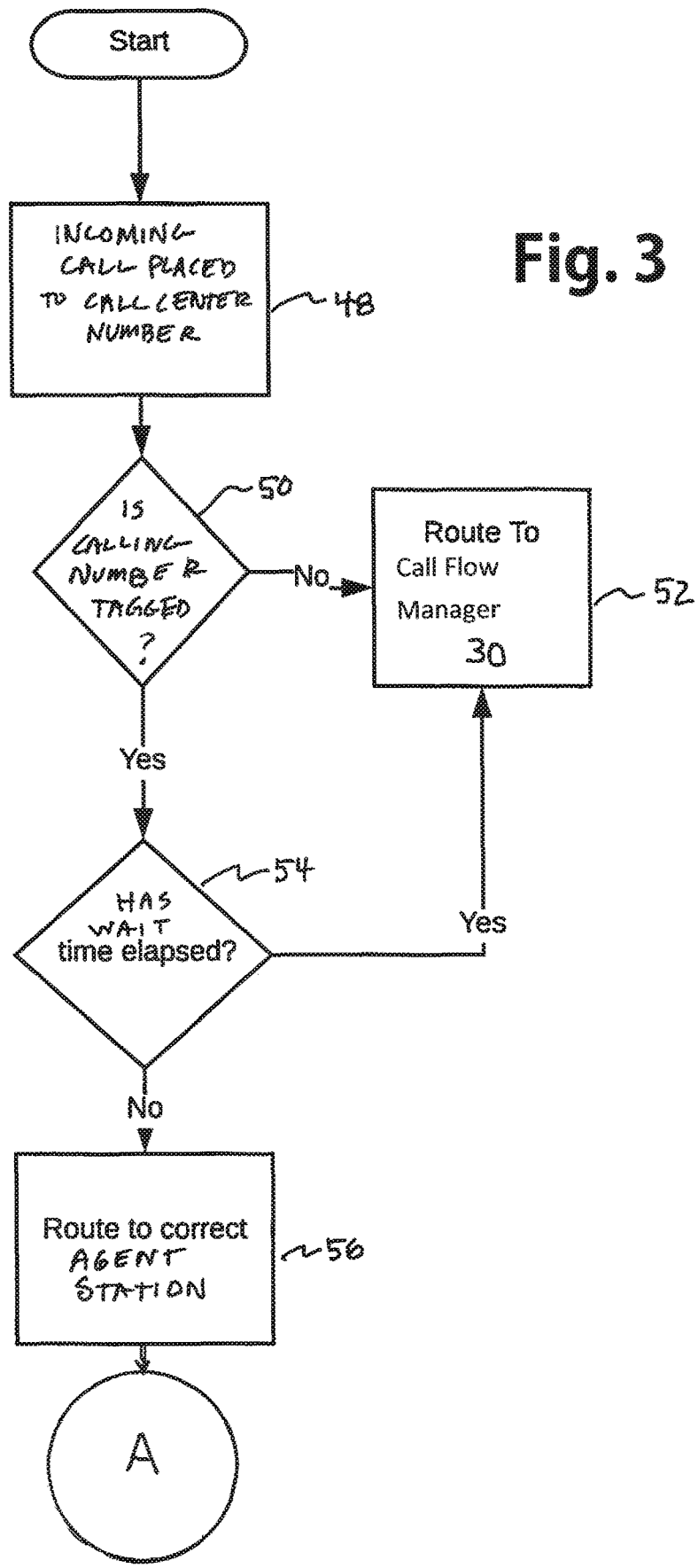
FIG. 3 is a flow diagram depicting a routine for directing a return call from an assigned contact to the calling agent.
Figure 4:
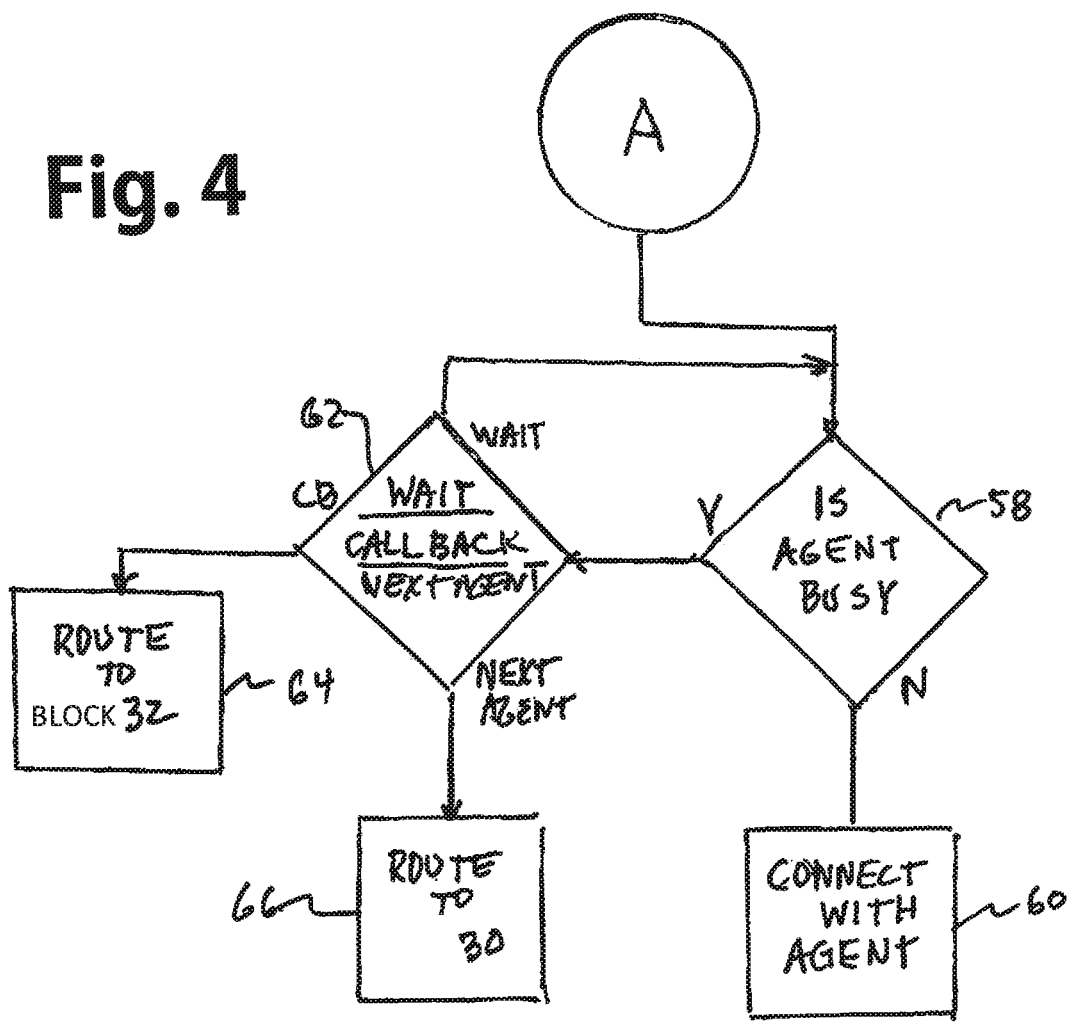
FIG. 4 is a continuation of the flow diagram depicted in FIG. 3.

A routine for processing an incoming call 48 at the call center 10 is depicted in FIG. 3. An inquiry is initially made as to whether the incoming calling number has been tagged, as illustrated in a block 50. If the number is not tagged, the call is routed to a default destination, i.e., the incoming call flow manager 30, e.g. an ACD, as illustrated in a block 52.

In the event the calling number is recognized as being tagged, the routine proceeds to determine whether the wait time between placement of the outbound call and receipt of the return call has expired, as shown in inquiry block 54. In the event the wait time has passed, the call is routed to the default destination, i.e., the incoming call flow manager 30, illustrated in a block 52.

If the wait time has not expired or no wait time has been set, the return call is routed directly to the agent station which initiated the call, as indicated in a block 56.

An inquiry is then made as to whether the agent is available to answer the return call, as indicated in a query box 58. If the agent is able to answer the return call, the routine proceeds to connect the return call with the agent, as indicated in a block 60.

If the agent is unable to answer the return call the routine proceeds to an inquiry block 62, wherein the contact .i.e., return caller, is asked whether he/she wishes to wait for the agent, receive a call back from the anent or wishes to speak with the next available agent, as indicated in a block 62.

If the contact elects to wait for the agent, the routine proceeds to block 58. If the contact wishes to receive a call back from the agent, the routine proceeds to block 32, as depicted in block 64, whereas if the contact is willing to talk with the next available agent, the routine proceeds to the call flow manager 30 as indicated in a block 66.

Additionally, while the foregoing description references a contact center telephone number and/or company name appearing in a contact's caller ID and in the memory of the contact's telephone, a dial plan could be employed at the contact center such that randomized outbound calling numbers could be selected, which, for example, may make the call to appear to be originating locally.

Thus it will be seen that there is provided a return call routing system which achieves the various aspects, features and considerations of the present invention and which is well suited to meet the conditions of practical usage.

In the figures of this application, in some instances, a plurality of elements may be shown as illustrative of a particular element, and a single element may be shown as illustrative of a plurality of a particular elements. Showing a plurality of a particular element is not intended to imply that a system or method implemented in accordance with the invention must comprise more than one of that element or step, nor is it intended by illustrating a single element that the invention is limited to embodiments having only a single one of that respective element. Those skilled in the art will recognize that the numbers of a particular element shown in a drawing can, in at least some instances, be selected to accommodate the particular user needs.

The particular combinations of elements and features in the above-detailed embodiment are exemplary only; the interchanging and substitution of these teachings with other teachings in this application are also expressly contemplated. As those skilled in the art will recognize, variations, modifications, and other implementations of what is described herein can occur to those of ordinary skill in the art without departing from the spirit and the scope of the invention as claimed.

Further, in describing the invention and in illustrating the invention in the figures, specific terminology, numbers, dimensions, materials, etc., may have been used for the sake of clarity. However the invention is not limited to the specific terms, numbers, dimensions, materials, etc. so selected, and each specific term, number, dimension, material, etc., at least includes all technical and functional equivalents that operate in a similar manner to accomplish a similar purpose. Use of a given word, phrase, number, dimension, material, language terminology, product brand, etc. is intended to include all grammatical, literal, scientific, technical, and functional equivalents. The terminology used herein is for the purpose of description and not limitation.

Having described a preferred embodiment of the invention, it will now become apparent to one of ordinary skill in the art that other embodiments incorporating the concept may be used. Moreover, those of ordinary skill in the art will appreciate that the embodiment of the invention described herein can be modified to accommodate and/or comply with changes and improvements in the applicable technology and standards referred to herein.

Variations, modifications, and other implementations of what k described herein can occur to those of ordinary skill in the art without departing from the spirit and the scope of the invention as claimed.

Having thus described the invention, there is claimed as new and desired to be secured by Letters Patent:

1. A method for routing an incoming return call from a contact to a call center having a plurality of agents, the call center having a call center telephone number and the contact having a telephone unit, the method comprising:
   a) assigning contact telephone numbers to the plurality of agents;
   b) determining if an outbound telephone number is an assigned contact telephone number;
   c) if the outbound telephone number is an assigned contact telephone number, determining whether the outbound telephone number has been assigned to an agent making the outbound call;
   d) tagging the outbound telephone number in a memory associated with the call center if it corresponds to the agent making the outbound call;
   e) forwarding the outbound call to the telephone unit associated with the outbound telephone number;
   f) registering the call center telephone number in a memory of the telephone unit;
   g) in the event the outbound call is unanswered, the assigned contact retrieving the call center telephone number from the memory of the telephone unit and placing a return call to the retrieved call center telephone number;
   h) determining if an incoming call is from an outbound telephone number which has been tagged;
   i) if the incoming call is from an outbound telephone number which has been tagged, forwarding the incoming call to the agent referred to in step c); and
   j) if the incoming call is not from an outbound telephone number which has been tagged, forwarding the incoming return call to an incoming call flow manager.

2. The method for routing an incoming return call in accordance with claim 1 further including establishing a time limit between forwarding the outbound call and receiving an incoming call prior to performing step h).

3. The method for routing an incoming return call in accordance with claim 2 further including the step of determining whether the time limit has passed and performing step i) if the time limit has not passed.

4. The method for routing an incoming return call in accordance with claim 2 further including the step of determining whether the time limit has passed and forwarding the incoming return call to an incoming call flow manager if the time limit has passed.

5. The method for routing an incoming return call in accordance with claim 1 further including the steps of determining whether the agent referred to in step c) is available to receive the incoming call prior to performing step i) and providing the contact with options if the agent is not available to receive the incoming call.

6. The method for routing a return an incoming call in accordance with claim 5 wherein the options include waiting for the agent to become available, receiving a call back from the agent or speaking with the next available agent.

7. The method for routing an incoming call in accordance with claim 6 further including the step of forwarding the incoming call to an incoming call flow manager in the event the contact elects to speak with the next available agent.

8. The method for routing an incoming call in accordance with claim 1 wherein each agent places outbound calls from an agent station.

9. The method for routing an incoming call in accordance with claim 1 further including the step of forwarding the outbound call to the outbound telephone number in the event the outbound telephone number was not an assigned contact telephone number after performing step b).

10. The method for routing an incoming call in accordance with claim 1 further including the step of forwarding the outbound call to the outbound telephone number in the event the outbound telephone number was not assigned to the agent making the outbound call after performing step c).

11. The method for routing an incoming call in accordance with claim 1 wherein step f) includes displaying the call center number in a caller ID screen.

12. A return call routing method for a call center having a call center telephone number and a plurality of agents, each agent having an agent station, each agent station having an assigned agent communication device, wherein a specific agent has been assigned a contact, the contact having a contact telephone number, the method comprising the steps of: a) determining whether an outbound telephone number from the call center is associated with both the specific agent and the assigned contact, b) if the outbound telephone number is associated with both the specific agent and the assigned contact, tagging such association in a first memory, c) forwarding the outbound call to a contact telephone unit associated with the outbound telephone number, d) registering the call center number in a second memory associated with the contact telephone unit; e) in the event the outbound call is unanswered, the contact retrieving the call center number from the second memory and placing a return call to the call center, f) accessing the first memory to determine whether the incoming return call telephone number has been tagged, g) in the event the incoming return call telephone number has been tagged, determining whether the specific agent is available to accept the incoming call, h) providing the contact with options in the event the specific agent is unavailable to accept the incoming call and, i) in the event the specific agent is available to accept the incoming call, forwarding the incoming return call to the specific agent's communication device.

13. The return call routing method for a call center in accordance with claim 12 wherein the outbound call is forwarded directly to the outbound telephone number in the event the outbound telephone number is not associated with both the specific agent and the assigned contact.

14. The return call routing method for a call center in accordance with claim 12 further including the steps of determining whether a time limit has passed between forwarding the outbound call to the outbound telephone number and receiving the incoming return call and forwarding the incoming return call to an incoming call flow manager if the time limit has passed.

15. The return call routing method for a call center in accordance with claim 12 wherein the options include waiting for the specific agent to become available, receiving a call back from the specific agent or speaking with the next available agent.

16. The return call routing method for a call center in accordance with claim 15 further including the step of forwarding the incoming return call to an incoming call flow manager in the event the contact elects to speak with the next available agent.

17. The return call routing method for a call center in accordance with claim 12 wherein step d) includes displaying the call center number in a caller ID screen.

18. A method of incentivizing call center agent productivity at a call center having a plurality of agents and a call center telephone number, the method comprising:
 a) assigning contact telephone numbers to agents;
 b) determining whether an outbound telephone number from the call center is associated with both an assigned contact an agent making the outbound call,
 c) tagging the outbound telephone number in a first memory if it corresponds to both the assigned contact and the agent making the outbound call;
 d) forwarding the outbound call to a telephone unit associated with the outbound telephone number;
 e) registering the call center telephone number in a second memory associated with the telephone unit;
 f) in the event the outbound call to the telephone unit associated with the outbound telephone number is not answered, the assigned contact retrieving the center telephone number from the second memory and placing a return call to the call center; g) determining if the incoming return call is from the outbound telephone number which has been tagged;
 h) forwarding the incoming call to an incoming call flow manager if the incoming return call is not from the outbound telephone number which has been tagged; and
 i) in the event the incoming return call is from the outbound telephone number which has been tagged, forwarding the incoming return call to the agent referred to in step b).

19. The method in accordance with claim 18 further including the steps of j) determining whether a time limit has passed between forwarding the outbound call to the outbound telephone number and receiving the incoming call and i) forwarding the incoming call to an incoming call flow manager if the time limit has passed.

20. The method in accordance with claim 18 wherein step e) includes displaying the call center number in a caller ID screen.

* * * * *